No. 871,913. PATENTED NOV. 26, 1907.
W. M. CASWELL.
TROLLEY WHEEL BEARING.
APPLICATION FILED JUNE 6, 1907.
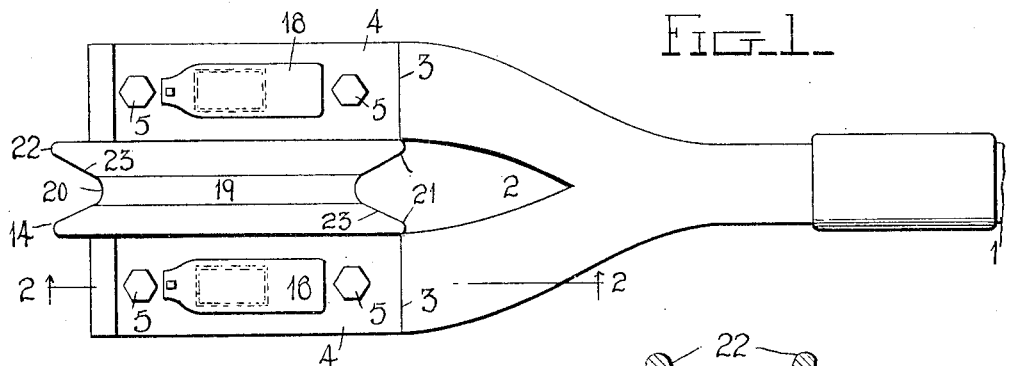
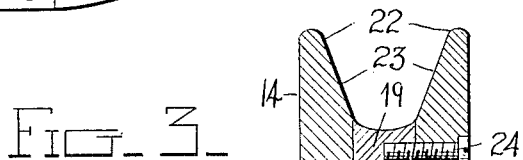
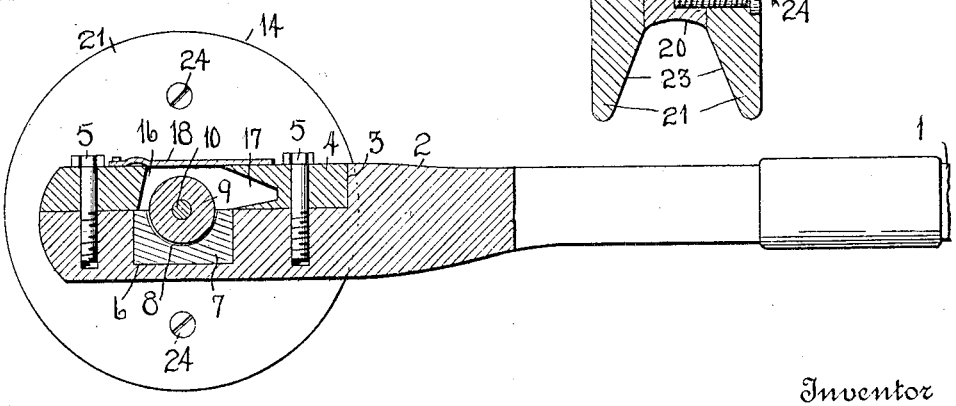
Witnesses
L. B. James
C. H. Griesbauer
Inventor
WM. M. CASWELL
by H. B. Willson &co
Attorneys

UNITED STATES PATENT OFFICE.

WILLIAM M. CASWELL, OF WARREN, PENNSYLVANIA.

TROLLEY-WHEEL BEARING.

No. 871,913.  Specification of Letters Patent.  Patented Nov. 26, 1907.

Application filed June 6, 1907. Serial No. 377,565.

*To all whom it may concern:*

Be it known that I, WILLIAM M. CASWELL, a citizen of the United States, residing at Warren, in the county of Warren and State of Pennsylvania, have invented certain new and useful Improvements in Trolley-Wheel Bearings; and I do declare the following to be a full, clear, and exact description of the invention, such as will enable others skilled in the art to which it appertains to make and use the same.

This invention relates to improvements in trolley wheel bearings.

The object of the invention is to provide a trolley wheel bearing in which is arranged an oil cup so disposed as to prevent the oil from running out of the bearing when the trolley wheel leaves the trolley wire and the pole flies upwardly to a vertical position.

With this object in view, the invention consists of certain novel features of construction, combination and arrangement of parts as will be more fully described and particularly pointed out in the appended claims.

In the accompanying drawings, Figure 1 is a plan view of a trolley wheel and fork embodying my invention; Fig. 2 is a longitudinal sectional view on the line 2—2 of Fig. 1; Fig. 3 is a vertical cross sectional view on the line of the axle of the trolley wheel; and Fig. 4 is a detail view of the trolley wheel axle.

Referring more particularly to the drawings, 1 denotes a trolley pole, on the upper end of which is arranged a fork, 2, the outer ends of the fork, 2, being recessed on their upper sides as shown at 3, and in said recesses are adapted to be secured right-angular cap plates, 4, said plates being detachably secured in place by means of bolts or screws, 5. In the recessed portion of the ends of the fork are formed recesses 6, in which are disposed Babbitt metal blocks 7, having in their upper sides semicircular bearings 8, in which are adapted to turn bearing rollers or wheels 9, which are screwed onto the reduced screw-threaded ends 10 of a trolley wheel axle, 12, having a squared central portion 13, on which is mounted a trolley wheel 14. The axle 12 is provided with a reduced cylindrical portion 15 arranged between the ends of the squared portion 13 and the reduced threaded portion 10, said reduced portion 15 being disposed in alined recesses formed in the adjacent edges of the ends of the fork and the cap plates.

In the cap plates 4, above and around the rollers 9 is formed a grease or oil chamber 16, at the lower end of which is formed a pocket 17, into which the grease from the chamber 16 is adapted to run when the trolley wheel leaves the wire and the pole flies upwardly to a vertical position, thus preventing the oil from running out of the open upper end of the chamber 16. The discharge of the oil or grease from the chamber 16 is further prevented by means of a spring cover plate 18, which is pivotally connected at one end to the upper side of the cap plate 4, and is adapted to be turned into and out of engagement with the open end of the chamber 16, to close and open the same.

The trolley wheel 14 is preferably constructed of an inner wire engaging section 19, having on its outer edge an annular groove 20, to engage the trolley wire. On each side of the central section 19 are arranged outer plates 21, the diameters of which are larger than that of the central section 19, so that the edges of said plates project beyond the edge of the section 19 and provide retaining flanges 22 by means of which the wheel is held in engagement with the wire. The inner sides of the flanges 22 are beveled or inclined as at 23 to provide a tapering extension wall for the groove 20. The plates 21 are preferably secured to the central portion 19 by means of screws or bolts, 24, whereby said plates may be quickly separated from the central or wearing portion of the wheel to permit the renewal of the latter when worn, thus reducing the expense of providing an entirely new trolley wheel.

Having described my invention, what I claim as new and desire to secure by Letters-Patent, is:

1. A trolley wheel bearing comprising a forked bearing arm adapted to be secured to the outer end of a trolley pole, said fork having formed in its ends bearing recesses, Babbitt metal blocks arranged in said bearing recesses, and detachable cap plates arranged in said recesses, said caps having formed therein grease or oil chambers, at one end of which is formed a pocket to receive the grease or oil when the trolley pole is in a vertical position, substantially as described.

2. A trolley wheel bearing consisting of a trolley fork adapted to be screwed onto the outer end of the trolley pole, said fork having formed in its outer end bearing recesses, Babbitt metal bearing blocks arranged in said recesses, cap plates detachably secured to the ends of said fork over said trolley wheel rollers, said plates having formed therein oil chambers, at one end of which is formed a pocket to receive the oil when the trolley pole is in a vertical position, and spring metal cover plates arranged on the upper end of said cap plates to close the oil chambers therein, substantially as described.

3. A trolley wheel bearing consisting of a trolley fork adapted to be screwed onto the outer end of the trolley pole, said fork having formed in its outer end bearing recesses, Babbitt metal bearing blocks arranged in said recesses, cap plates detachably secured to the ends of said fork over said trolley wheel rollers, said plates having formed therein oil chambers, at one end of which is formed a pocket to receive the oil when the trolley pole is in a vertical position, spring metal cover plates arranged on said cap plates to close the oil chambers therein, and bearing rollers adapted to revolve in said Babbitt metal bearing blocks and to receive the axle of the trolley wheel, substantially as described.

In testimony whereof I have hereunto set my hand in presence of two subscribing witnesses.

WILLIAM M. CASWELL.

Witnesses:
   JOHN E. WHEELER,
   RALPH W. COUSINS.